No. 720,699. PATENTED FEB. 17, 1903.
W. H. KING.
THRESHING MACHINE.
APPLICATION FILED JUNE 17, 1902.
NO MODEL. 4 SHEETS—SHEET 1.
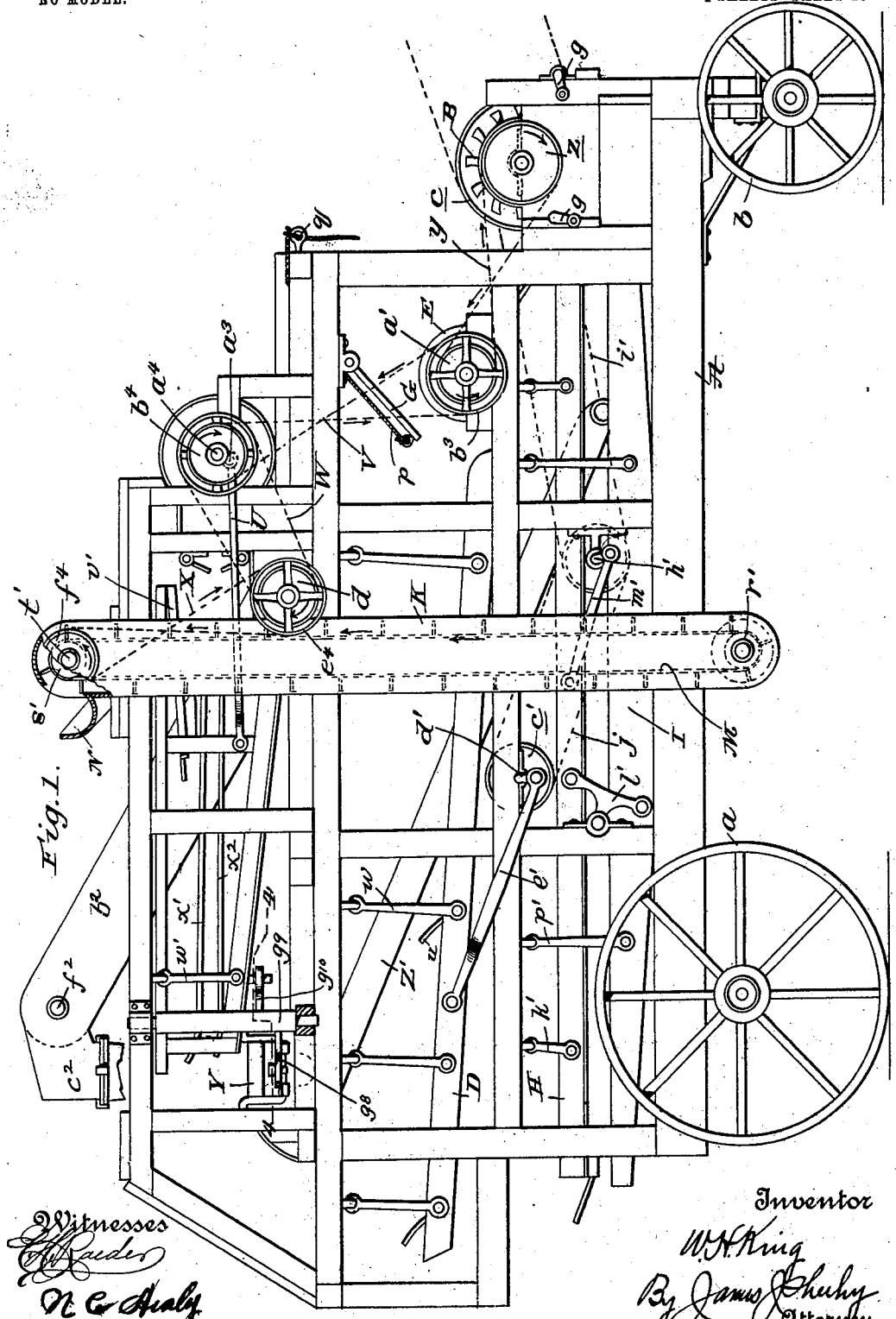

No. 720,699. PATENTED FEB. 17, 1903.
W. H. KING.
THRESHING MACHINE.
APPLICATION FILED JUNE 17, 1902.
NO MODEL. 4 SHEETS—SHEET 2.
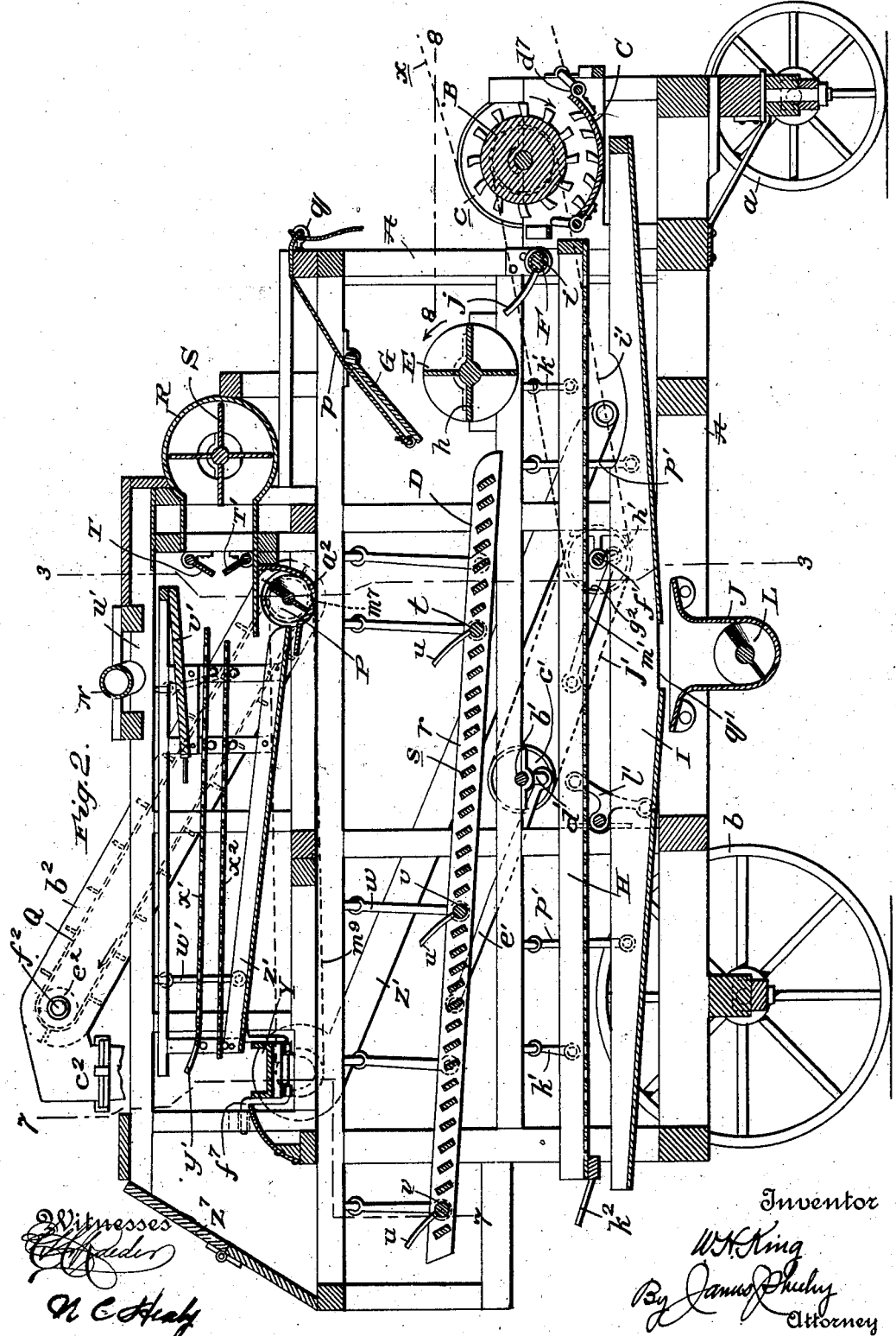
Inventor
W. H. King
By James Phelry
Attorney
Witnesses
N. C. Healy

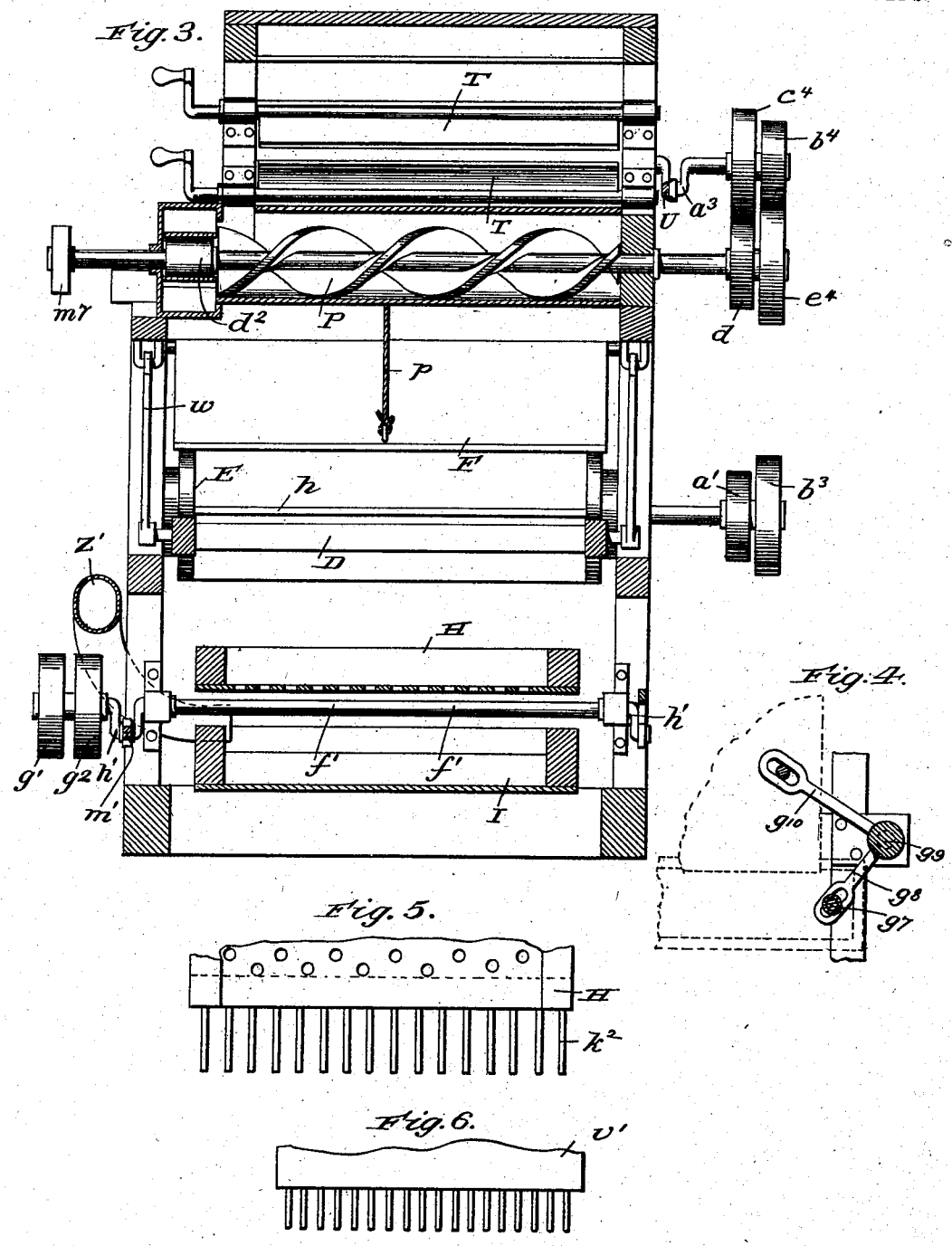

No. 720,699. PATENTED FEB. 17, 1903.
W. H. KING.
THRESHING MACHINE.
APPLICATION FILED JUNE 17, 1902.
NO MODEL. 4 SHEETS—SHEET 4.
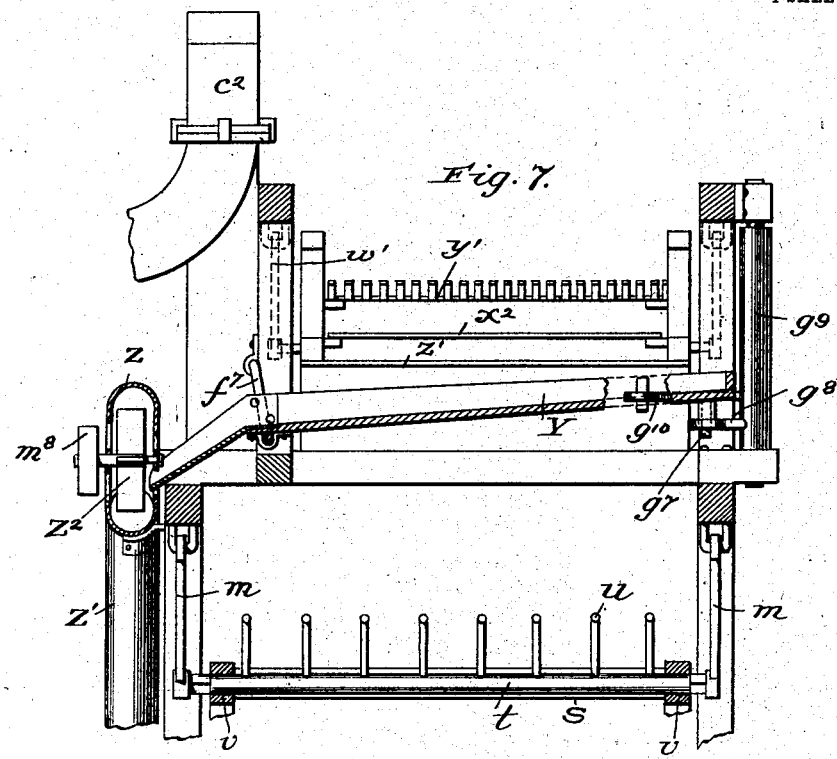
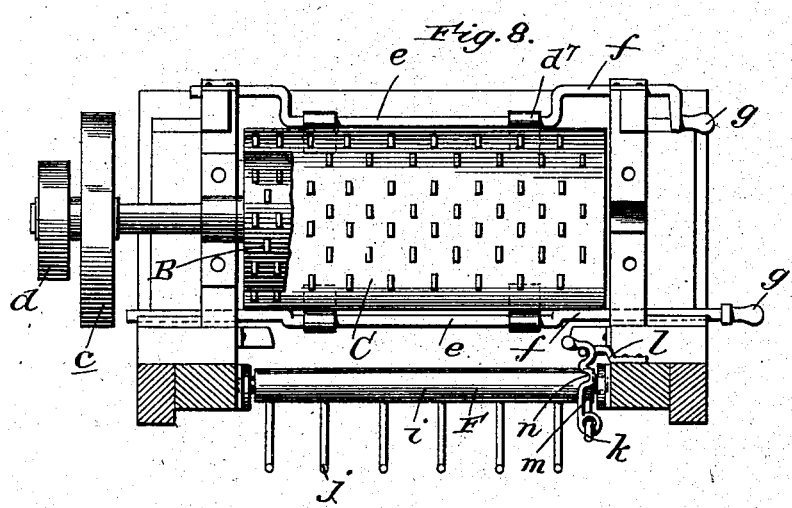
Witnesses
Inventor
W. H. King
By James J. Sheehy
Attorney

UNITED STATES PATENT OFFICE.

WILLIAM HENRY KING, OF LINCOLN, NEBRASKA.

THRESHING-MACHINE.

SPECIFICATION forming part of Letters Patent No. 720,699, dated February 17, 1903.

Application filed June 17, 1902. Serial No. 112,083. (No model.)

*To all whom it may concern:*

Be it known that I, WILLIAM HENRY KING, a citizen of the United States, residing at Lincoln, in the county of Lancaster and State of Nebraska, have invented new and useful Improvements in Threshing-Machines, of which the following is a specification.

My invention relates to threshing-machines, and has for its general object to provide a threshing-machine possessed of large capacity both as to expeditiously and thoroughly separating grain from straw and cleaning the threshed grain.

Other objects and advantageous features of the invention will be fully understood from the following description and claims when taken in conjunction with the accompanying drawings, in which—

Figure 1 is a side elevation of a threshing-machine constituting one embodiment of my invention; Fig. 2, a vertical longitudinal central section of the same; Fig. 3, a slightly-enlarged transverse section taken in the plane indicated by the broken line 3 3 of Fig. 2; Fig. 4, a slightly-enlarged detail horizontal section taken on the broken line 4 4 of Fig. 1 and illustrating the means for transmitting motion from the grain-cleaning shoe to the tailings-trough; Fig. 5, an enlarged detail plan of the rear end of the upper riddle of the shoe; Fig. 6, a similar view of the rear end of the inclined grain and chaff receiving board of the shoe; Fig. 7, a slightly-enlarged transverse section taken on the broken line 7 7 of Fig. 2, and Fig. 8 a detail horizontal section taken in the plane indicated by the broken line 8 8 of Fig. 2.

Similar letters of reference designate corresponding parts in all of the several views of the drawings, referring to which—

A is the thresher-frame, preferably mounted on front and rear wheels $a$ $b$; B, a toothed cylinder mounted in the forward portion of the frame and having one of its trunnions extended beyond the same and equipped with band-pulleys $c$ $d$, and C a toothed concave disposed below the cylinder and having eyes $d^7$ at its forward and rear edges receiving the cranks $e$ of transverse shafts $f$. In addition to the cranks $e$ the shafts $f$ have handles $g$ at one end, Figs. 1 and 8, by turning which the thresher attendant is enabled to readily increase or diminish the distance between either the front edge or the rear edge of the concave and the toothed cylinder, as the condition of the grain and the speed at which it is fed between the cylinder and concave demand. When necessary, suitable means may be employed for adjustably holding the handles $g$ in the various positions in which they are placed.

D is a long endwise-movable straw-rack disposed in the frame at about the proportional distance illustrated in rear of the cylinder and concave; E, a transversely-disposed beater mounted in the frame at a point adjacent to the forward end of the rack and having four (more or less) blades $h$; F, a deflector mounted in the frame at a point between the cylinder and concave and the beater, and G a straw-retarding board hung in the frame above the beater E. The beater is designed to be rotated in the direction indicated by arrow in Fig. 2 and has for its purpose to beat bundles of the straw which pass over it down on the forward portion of the rack D. By thus beating the straw down on the rack the beater is enabled to thoroughly and expeditiously knock the grain out of the straw, and this without tearing the straw to pieces, as is the case when the straw is conducted under the beater.

The deflector F preferably comprises a transverse rack-shaft $i$, journaled in the frame A, and a plurality of tangs $j$, extending upwardly and rearwardly from the shaft, and it is designed to be fixed in different positions with respect to the beater E, preferably through the medium of the means best shown in Fig. 8, which means comprises an arm $k$ on the shaft $i$, a keeper $l$ on the frame, and a latch $m$, connected to the arm $k$ and having notches $n$, designed to be placed in engagement with the keeper. When the grain to be threshed is wet or tough, the deflector F is adjustably fixed with its tangs in their lowermost position, as shown in Fig. 8, this in order to enable the blades of the beater to heavily strike the straw and more thoroughly knock the grain out of the same, while when the grain is dry and it is necessary for the beater to strike the straw but lightly the deflector is adjustably fixed with its tangs in their uppermost position.

The purpose of the retarder G is to catch and stop flying straw and compel the same to pass from the beater to the forward portion of the rack D. It is designed to be adjustably held in various positions with respect to the beater E by suitable means, as a cable $p$ and fastener $q$, and hence may be made to retard the rearward passage of the grain more or less, as the conditions require.

The rack D comprises, as shown, a frame made up of longitudinal side bars $r$ and cross-bars $s$ and transverse shafts $t$, provided at intervals of their length with upwardly and rearwardly extending fingers or tangs $u$. The shafts $t$ are loosely arranged in apertures $v$ in the side bars $r$ and are fixed to hangers $w$, connected in a hinged manner to and depending from the main frame. In virtue of this construction it will be seen that when the rack-frame is moved to and fro in the direction of its length it will move upwardly and downwardly toward and from the fingers or tangs $u$, and consequently said fingers or tangs will operate to open the straw and accelerate the separation of grain therefrom, as well as assist in feeding the straw rearwardly.

The cylinder B is designed to be driven by an engine (not shown) through the medium of a belt $x$, which is passed around pulley $c$, and motion is transmitted from said cylinder to the beater E through a crossed belt $y$, which is passed around a pulley $z$ on one trunnion of the cylinder and a pulley $a'$ on the corresponding trunnion of the beater. Motion is also transmitted from the cylinder to the straw-rack through the medium of a transverse shaft $b'$, having a band-pulley $c'$ at one end and also having cranks $d'$, pitmen $e'$, connecting said cranks and the rack, a transverse shaft $f'$, having band-pulleys $g'$ $g^2$ and also having cranks $h'$, a belt $i'$, which passes around the pulley $d$ on the trunnion of the cylinder and one of the pulleys on the shaft $f'$, and a belt $j'$, which passes around the other pulley on the shaft $f'$ and the pulley $c'$.

By virtue of the construction thus far described it will be observed that the grain is expeditiously knocked and separated from the straw and the straw is caused to quickly pass to and through the discharge end of the frame, which contributes materially to the large capacity of the machine. From the discharge end of the machine the straw may pass to a stacker or other apparatus, which I have deemed it unnecessary to illustrate, placed to receive it.

H is a "chaffer"—i. e., a foraminated tray, with or without tangs $k^2$ at its rear end—designed to receive the chaff and grain knocked out of the straw and separate the grain from the chaff, as well as work the latter to and discharge it through the rear end of the machine. By reason of the peculiar arrangement of the fan, presently described, I am enabled to extend the chaffer practically the full length of the machine, or, in other words, from a point adjacent to the rear edge of the concave C to and through the rear end of the frame. This arrangement is materially advantageous, since the chaffer is enabled to receive grain and chaff from the rack D and beater E, as well as from the straw *en route* between the cylinder and concave and the beater, and consequently has a large separating capacity. It is also advantageous because it contributes to the simplicity and durability of the machine as a whole and renders the same very easy to operate. The chaffer is connected by hangers $k'$ and levers $l'$ to the frame and is designed to be moved endwise forwardly and rearwardly through the medium of pitmen $m'$, interposed between it and the cranks $h'$ of the transverse shaft $f'$.

I is a grain-pan disposed below the chaffer H and connected to the depending arms of the levers $l'$ and also connected to hangers $p'$, which, in turn, are connected to the frame. Being connected, as stated, to the levers $l'$, it follows that the pan I will move forwardly incident to the rearward movement of the chaffer, and vice versa; also, that the strokes of the chaffer and pan will be short and quick, with the result that the passage of grain through the same is accelerated. The bottom of the pan I is inclined downwardly toward its discharge-opening $q'$, which is preferably arranged at its transverse center, as shown.

J is a transverse trough arranged to receive from the discharge-opening of the pan; K, an elevator-casing communicating with and extending upwardly from one end of the trough; L, a spiral conveyer arranged in the trough J and designed to move the grain received in the trough to the lower end of the casing K; M, an endless elevator arranged in the casing K and passed around a pulley $r'$ on the conveyer-shaft and also around a pulley $s'$ on a shaft $t'$, journaled in the upper portion of the casing, and N a chute arranged to receive the grain and foreign substance from the elevator and discharge the same through an opening $u'$ in the top of the frame and on the inclined board $v'$ of the cleaning-shoe. (Best shown in Fig. 2.) The said shoe is connected by hangers $w'$ to the frame and comprises, in addition to the board $v'$, riddles $x'$ $x^2$, the upper of which is arranged to receive grain and chaff from the board $v'$ and is preferably provided at its rear end with tongs $y'$ and a forwardly and downwardly inclined grain-board $z'$ disposed below the riddle. The said grain-board is arranged to discharge into a transverse trough $a^2$, which communicates at one end with an elevator-casing $b^2$, which extends upwardly and rearwardly and communicates in turn with a discharge-spout $c^2$. In the trough $a^2$ is a spiral conveyer P, while in the casing $b^2$ is an endless elevator Q, arranged to receive grain from the conveyer and discharge the same in the spout $c^2$. The said elevator passes around a pulley $d^2$ on the shaft of the conveyer P and also around a pulley $e^2$ on a short shaft $f^2$, journaled in the upper rear portion of the casing $b^2$.

R is a fan-casing arranged in front of the cleaning-shoe and having a rearwardly-disposed discharge, Fig. 2; S, a fan in said casing; T T', upper and lower adjustable windboards which control the discharge of the fan-chamber and are designed to enable the attendant to deflect the blast of air to the upper or lower portion of the cleaning-shoe, as desired; U, Fig. 1, a pitman connecting the cleaning-shoe and a crank $a^3$ on the shaft $a^4$ of the fan S; V, a crossed belt connecting a pulley $b^3$ on the shaft of the beater E and a pulley $b^4$ on the fan-shaft $a^4$; W, a belt connecting a pulley $c^4$ on fan-shaft $a^4$ and a pulley $d^4$ on the shaft of the conveyer P, and X a crossed belt connecting a pulley $e^4$ on the said conveyer-shaft and a pulley $f^4$ on the elevator-shaft $t'$.

By virtue of the gearing just described it will be seen that when the machine is in operation the fan S and the conveyers P L will be rotated and the elevators M and Q driven in the directions indicated by arrows. It will also be seen that the connection between the fan-shaft and the cleaning-shoe is such that the vibration of the latter will quickly work off the grain and also assist materially in expeditiously cleaning the grain precedent to the discharge of the same into the trough $a^2$, and, further, that by reason of the large area of its riddles the shoe has a large cleaning capacity. The cleaned grain passes from the cleaning-shoe into the trough $a^2$ in the manner before described, while the tailings fall into a transverse trough Y, disposed in rear of the cleaning-shoe. The said trough Y, Figs. 1 and 7, is connected at a point adjacent to its discharge end to a bail-hanger $f^7$, which in turn is pivotally connected to the frame A. Adjacent to its opposite end the trough is provided on its under side with a stud $g^7$, which is connected to one arm $g^8$ of a bell-crank lever, which comprises a vertical post $g^9$, journaled in the frame A, the same arm $g^8$, and an arm $g^{10}$, extending at right angles to the arm $g^8$ and connected to the grain-board of the cleaning-shoe. By reason of this connection between the shoe and the trough Y it will be seen that when the shoe is reciprocated longitudinally of the machine the trough Y will be reciprocated transversely of the machine—the latter to enable the trough to quickly work off the tailings.

Z is a blower-casing arranged to receive the tailings from the discharge end of the trough Y and having a conduit Z' extending downwardly and forwardly and then laterally inward, Fig. 2, so as to discharge on the pan I in rear of the cylinder and concave, and $Z^2$ is a blower arranged in the casing Z and designed to be driven by the conveyer P through the medium of a pulley $m^7$ on the conveyer-shaft, a pulley $m^8$ on the blower-shaft, and a belt $m^9$, passed around said pulleys. The blower serves in practice to knock the grain out of the unthreshed heads and by discharging the grain on the pan I in rear of the cylinder and concave removes the liability of the grain being cracked incident to its second passage through the machines. It also serves, as will be readily appreciated, to discharge a blast of air beneath the chaffer H, and thereby assists materially in effecting the separation of the chaff from the grain.

$Z^7$ is a door which I prefer to provide at the rear end of the machine in order to enable the attendants to readily gain access to the riddles to change the same or for any other purpose.

As will be readily observed by reference to the drawings, all of the hangers and other connections between the working parts and frame of my improved machine, as well as the driving connections, are at opposite sides of the frame. This is obviously advantageous, since it permits of said connections being repaired or replaced with new parts when necessary with great facility and at a minimum cost.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. The combination in a threshing-machine, of a frame, a toothed cylinder, a toothed concave arranged adjacent to the periphery of the cylinder, a straw-rack in rear of the cylinder and concave, a rotary beater arranged in front of the rack, an adjustable deflector disposed intermediate of the cylinder and concave and the beater, and comprising a rock-shaft journaled in the frame and having an arm, and tangs extending upwardly and rearwardly from the shaft, a keeper connected to the frame, and a latch connected to the arm of the deflector-shaft and having notches adapted to be placed in engagement with the keeper on the frame.

2. In a threshing-machine, the combination of a frame, a toothed cylinder, a toothed concave for operating in conjunction with the cylinder, a straw-rack in rear of the cylinder and concave, means for causing the grain discharged from between the cylinder and concave to pass to the rack, a cleaning-shoe disposed above the straw-rack, a fan-casing also disposed above the straw-rack and in front of the shoe and having a rearwardly-disposed discharge, a fan in said casing, a "chaffer" disposed below the straw-rack and extending from a point adjacent to the cylinder and concave rearwardly, a grain-pan disposed below the "chaffer," means for conveying the grain and substance commingled therewith from the grain-pan to the cleaning-shoe, means for receiving the cleaned grain from the shoe, a trough arranged to receive tailings from the shoe, and means for conveying the tailings of said trough back to the grain-pan.

3. In a threshing-machine, the combination of a frame, a toothed cylinder, a toothed concave for operating in conjunction with the cylinder, a straw-rack in rear of the cylinder and concave, means for causing the grain discharged from between the cylinder and concave to pass to the rack, a cleaning-shoe disposed above the straw-rack, a fan-casing also disposed above the straw-rack and in front of the shoe and having a rearwardly-disposed discharge, a fan in said casing, a "chaffer" disposed below the straw-rack and extending from a point adjacent to the cylinder and concave rearwardly, a grain-pan disposed below the "chaffer," means for conveying the grain and substance commingled therewith from the grain-pan to the cleaning-shoe, means for receiving cleaned grain from the shoe, a trough arranged to receive tailings from the shoe, a blower-casing arranged to receive the tailings from the trough and having a conduit arranged to discharge in the grain-pan, and a blower in said casing.

4. In a threshing-machine, the combination of a frame, a toothed cylinder; a toothed concave, a straw-rack in rear of the cylinder and concave, a rotary beater in front of the straw-rack, a deflector for causing the grain discharged from between the cylinder and concave to pass over the beater, a cleaning-shoe disposed above the straw-rack, a fan-casing also disposed above the straw-rack and in front of the shoe, and having a rearwardly-disposed discharge, a fan in said casing, a "chaffer" disposed below the straw-rack and the beater, a grain-pan disposed below the "chaffer" and having a discharge, a transverse trough arranged to receive from the discharge of the pan, a conveyer in said trough, an elevator-casing communicating at its lower end with said trough, an elevator in said casing, a chute arranged to receive grain from the elevator and convey the same to the cleaning-shoe, a transverse trough arranged to receive cleaned grain from the shoe, a conveyer in said trough, an elevator-casing communicating with the trough, and having a discharge-spout, an elevator in said casing, an endwise-movable, transverse trough arranged to receive tailings from the shoe, a blower-casing arranged to receive the tailings from the trough and having a conduit arranged to discharge in the grain-pan, and a blower in said casing.

In testimony whereof I have hereunto set my hand in presence of two subscribing witnesses.

WILLIAM HENRY KING.

Witnesses:
 H. E. WELLS,
 W. L. DAWSON.